United States Patent
Darling et al.

(10) Patent No.: US 12,247,550 B1
(45) Date of Patent: Mar. 11, 2025

(54) LOCK OUT TAG OUT DEVICE AND METHOD OF USE

(71) Applicants: Travis Darling, Chula Vista, CA (US); Augusto Bejar Lorenzo, San Diego, CA (US)

(72) Inventors: Travis Darling, Chula Vista, CA (US); Augusto Bejar Lorenzo, San Diego, CA (US)

( * ) Notice: Subject to any disclaimer, the term of this patent is extended or adjusted under 35 U.S.C. 154(b) by 0 days.

(21) Appl. No.: 18/902,338

(22) Filed: Sep. 30, 2024

Related U.S. Application Data

(60) Provisional application No. 63/666,158, filed on Jun. 29, 2024.

(51) Int. Cl.
*F03D 80/00* (2016.01)

(52) U.S. Cl.
CPC ........ *F03D 80/001* (2023.08); *F05B 2260/31* (2020.08)

(58) Field of Classification Search
CPC ..... F03D 80/001; F03D 80/50; F05B 2260/31
See application file for complete search history.

(56) References Cited

U.S. PATENT DOCUMENTS

2019/0277254 A1\* 9/2019 Larsen ................. F03D 7/0264
2019/0345914 A1\* 11/2019 Thomsen ................ F03D 80/00

\* cited by examiner

*Primary Examiner* — Aaron R Eastman
(74) *Attorney, Agent, or Firm* — Procopio, Cory, Hargreaves & Savitch LLP

(57) ABSTRACT

A lock-out tag-out (LOTO) device comprising a handle including at least first and second holes; a pipe configured to maintain an object to be locked in a locked condition; a rod configured to be received within the first hole of the handle and be received within the pipe, the rod including a hole; a locking pin configured to be received within both the second hole of the handle and the hole of the rod to secure the rod in position relative to the handle, the locking pin including one or more holes configured to receive one or more separate LOTO locks.

13 Claims, 5 Drawing Sheets

```
                                                    ┌─ 435
                                                    ✓
  440 ─┐
  ┌──────────────────────────────────────────────────────────────┐
  │ Engaging the front plate of the low-speed rotor lock with the handle │
  └──────────────────────────────────────────────────────────────┘
                              │
  460 ─┐                      ▼
  ┌──────────────────────────────────────────────────────────────┐
  │ Receiving the rod within the first hole of the handle on a first side of the │
  │ front plate and within the pipe on the opposite second side of the │
  │                      front plate                             │
  └──────────────────────────────────────────────────────────────┘
                              │
  490 ─┐                      ▼
  ┌──────────────────────────────────────────────────────────────┐
  │ Receiving the locking pin within both the second hole of the handle and │
  │ the hole of the rod to secure the rod in position relative to the handle │
  └──────────────────────────────────────────────────────────────┘
                              │
  500 ─┐                      ▼
  ┌──────────────────────────────────────────────────────────────┐
  │ Receiving one or more separate LOTO locks in the one or more holes │
  │                 of the locking pin                           │
  └──────────────────────────────────────────────────────────────┘
                              │
  510 ─┐                      ▼
  ┌──────────────────────────────────────────────────────────────┐
  │ Using the pipe of the LOTO device engaged to the low-speed rotor lock │
  │ to maintain the plunger engaged with the rotor to prevent the rotor from │
  │                       spinning                               │
  └──────────────────────────────────────────────────────────────┘
                              │
  530 ─┐                      ▼
  ┌──────────────────────────────────────────────────────────────┐
  │ Putting the LOTO device in the storage configuration by inserting the │
  │ rod within the first hole of the handle and the pipe, and inserting the │
  │ locking pin within both the third hole of the handle and the hole of the rod │
  └──────────────────────────────────────────────────────────────┘
```

FIG. 9

LOCK OUT TAG OUT DEVICE AND METHOD OF USE

CROSS-REFERENCE TO RELATED APPLICATIONS

This application claims the benefit of U.S. Provisional Application No. 63/666,158, filed on Jun. 29, 2024 under 35 U.S.C. 119, and which is incorporated by reference herein.

FIELD OF THE INVENTION

The present invention generally relates to rotor locks for wind turbines.

BACKGROUND OF THE INVENTION

A Low Speed Rotor lock (LSRL) for a Wind Turbine Generator (WTG) is used for locking out the low speed side of the WTG to prevent the unintentional release of energy on the rotor to safely perform work on that system. Oftentimes lockout devices are not available for the various configurations of the LSRL.

To Lock Out Tag Out (LOTO) the LSRL many steps are taken to secure the rotor in place. The LSRL is engaged. A back up piece of wood or all thread is secured to prevent the LSRL from vibrating or backing out. In some instances, the safety chain sensor is manipulated with zip ties to allow work to be performed. No Personal LOTO is protecting the unit from unintentionally being operated. Lack of a proper LOTO prevents some stages of the LOTO to be manipulated such as zip ties being removed or the wood or all thread from being taking out of the system. Many parts are used to completely lock the LSRL.

In order to meet governmental regulations, such as those mandated by the Occupational Safety and Health Administration (OSHA) and to protect workers sufficiently from hazards posed by a poorly locked out LSRL, the aspect(s) of the disclosure shown and described herein was created.

SUMMARY OF THE INVENTION

An aspect of the disclosure involves a lock-out tag-out (LOTO) device that prevents the unauthorized removal of a Low Speed Rotor Lock. The LOTO device also prevents the system from activating a LSRL safety chain (fault). Specifically, it relates to a manually operated LSRL. This type of system is typically used to prevent the rotor from spinning so work can be performed on the system.

The lock-out tag-out (LOTO) device is used to lock the LSRL into position while bypassing a switch for the LSRL safety chain so no safety chain is present. The LOTO device provides a place for technicians to apply a personal lock and prevents any removal of the LOTO device until every lock is off. The LOTO device prevents the LSRL from being able to vibrate or become disengaged while bypassing the safety chain for the LSRL. The LOTO device was initially invented to be used during the maintenance and repairs of commercial wind turbines whereas most wind turbines are not designed or manufactured in the United States and oftentimes do not necessarily come equipped with machinery that can be locked out to meet government regulations such as those promulgated by the Occupational and Safety Hazards Administration (OSHA).

The LOTO device has multiple pieces that fit together and lock into place when a lock is applied. The LOTO device is ideally used in instances where presently available lockout devices are not practical, desirable, or effective against the unintentional operation of the rotor, but may be used in many other industries including factories and aboard various types of vessels. Primary considerations for the design of the LOTO device and what sets it apart from many other such devices are case of use, durability, speed of installation, simplicity, and effectiveness.

Another aspect of present disclosure involves a lock-out tag-out (LOTO) device for a low-speed rotor lock of a wind turbine generator including a rotor, the low-speed rotor lock including a front plate with a hole and a plunger that moves relative to the front plate to engage the rotor to prevent the rotor from spinning comprising a handle including at least first and second holes and configured to engage the front plate of the low-speed rotor lock; a pipe configured to maintain the plunger engaged with the rotor to prevent the rotor from spinning; a rod configured to be received within the first hole of the handle on a first side of the front plate and be received within the pipe on an opposite second side of the front plate, the rod including a hole; a locking pin configured to be received within both the second hole of the handle and the hole of the rod to secure the rod in position relative to the handle, the locking pin including one or more holes configured to receive one or more separate LOTO locks.

One or more implementations of the above aspect of the disclosure include one or more of the following: the LOTO device includes a locking configuration where the handle engages the front plate of the low-speed rotor lock, the pipe maintains the plunger engaged with the rotor to prevent the rotor from spinning, the rod is received within the first hole of the handle on a first side of the front plate and is received within the pipe on the opposite second side of the front plate, the locking pin is received within both the second hole of the handle and the hole of the rod to secure the rod in position relative to the handle, and the one or more holes of the locking pin receive one or more separate LOTO locks; the low-speed rotor lock includes a limit switch lever that causes a safety chain to be activated when disengaged and deactivated when engaged, and the handle includes a head configured to engaged the limit switch lever to deactivate the safety chain; the handle includes a third hole and the LOTO device includes a storage configuration where the rod is received within the first hole of the handle and the pipe, and the locking pin is received with both the third hole of the handle and the hole of the rod; the rod includes an end configured to be coupled with a fastener to secure the handle, the pipe, the locking pin, and the rod in the storage configuration; the handle includes a notch configured to engage the front plate of the low-speed rotor lock; one or more tethers coupling the handle to the rod and the locking pin; the handle includes a base and a head, the base including the first and second holes, the first hole being a slotted hole and the second hole extending transversely to and communicating with the slotted first hole; and/or the handle includes a third hole extending from the head and through the base, communicating with the slotted first hole.

Another aspect of present disclosure involves a method of using a LOTO device to lock out a low-speed rotor lock to prevent a rotor from spinning, the LOTO device comprising a handle including at least first and second holes and configured to engage the front plate of the low-speed rotor lock; a pipe configured to maintain the plunger engaged with the rotor to prevent the rotor from spinning; a rod configured to be received within the first hole of the handle on a first side of the front plate and be received within the pipe on an opposite second side of the front plate, the rod including a hole; a locking pin configured to be received within both the second hole of the handle and the hole of the rod to secure the rod in position relative to the handle, the locking pin including one or more holes configured to receive one or more separate LOTO locks, the method comprising engaging the front plate of the low-speed rotor lock with the handle; receiving the rod within the first hole of the handle on a first side of the front plate and within the pipe on the opposite second side of the front plate; receiving the locking pin within both the second hole of the handle and the hole of the rod to secure the rod in position relative to the handle; receiving one or more separate LOTO locks in the one or more holes of the locking pin; using the pipe of the LOTO device engaged to the low-speed rotor lock to maintain the plunger engaged with the rotor to prevent the rotor from spinning.

One or more implementations of the aspect of the disclosure described immediately above include one or more of the following: the low-speed rotor lock includes a limit switch lever that causes a safety chain to be activated when disengaged and deactivated when engaged, the handle of the LOTO device includes a head configured to engage the limit switch lever in the locking configuration, and the method further comprising using the head of the handle to engage the limit switch lever to deactivate the safety chain; the handle includes a third hole and the LOTO device includes a storage configuration where the rod is received within the first hole of the handle and the pipe, and the locking pin is received with both the third hole of the handle and the hole of the rod, and the method further comprising putting the LOTO device in the storage configuration by inserting the rod within the first hole of the handle and the pipe, and inserting the locking pin within both the third hole of the handle and the hole of the rod; the rod includes an end configured to be coupled with a fastener to secure the handle, the pipe, the locking pin, and the rod in the storage configuration; the handle includes a notch configured to engage the front plate of the low-speed rotor lock; one or more tethers coupling the handle to the rod and the locking pin; the handle includes a base and a head, the base including the first and second holes, the first hole being a slotted hole and the second hole extending transversely to and communicating with the slotted first hole; and/or the handle includes a third hole extending from the head and through the base, communicating with the slotted first hole.

A further aspect of the disclosure involves a lock-out tag-out (LOTO) device comprising a handle including at least first and second holes; a pipe configured to maintain an object to be locked in a locked condition; a rod configured to be received within the first hole of the handle and be received within the pipe, the rod including a hole; a locking pin configured to be received within both the second hole of the handle and the hole of the rod to secure the rod in position relative to the handle, the locking pin including one or more holes configured to receive one or more separate LOTO locks.

A still further aspect of present disclosure involves a method of using a LOTO device to maintain an object to be locked in a locked condition, the LOTO device comprising a handle including at least first and second holes; a pipe configured to maintain an object to be locked in a locked condition; a rod configured to be received within the first hole of the handle and be received within the pipe, the rod including a hole; a locking pin configured to be received within both the second hole of the handle and the hole of the rod to secure the rod in position relative to the handle, the locking pin including one or more holes configured to receive one or more separate LOTO locks, the method comprising engaging the object to be locked out with the handle; receiving the rod within the first hole of the handle and within the pipe; receiving the locking pin within both the second hole of the handle and the hole of the rod to secure the rod in position relative to the handle; receiving one or more separate LOTO locks in the one or more holes of the locking pin; using the pipe of the LOTO device engaged to the object to the locked out to maintain the object to be locked out in a locked out condition.

BRIEF DESCRIPTION OF THE DRAWINGS

In order to describe the manner in which the present disclosure can be implemented, a more particular description will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which:

FIG. 9 is a flow chart of an exemplary method of using the LOTO device of FIG. 4.

DETAILED DESCRIPTION OF PREFERRED EMBODIMENTS

In this disclosure, as illustrated in FIGS. 1-9, specific terminology is employed for the sake of clarity. The invention as claimed in this application, however, is not intended to be limited to specific terminology so selected, and it is to be understood that each specific element includes all technical equivalents that operate in a similar manner to accomplish similar functions.

Reference will now be made to the figures to describe various aspects of example embodiments of the disclosure. Before describing a lock-out tag-out (LOTO) device 100 for a Low Speed Rotor Lock (LSRL) 110 of a wind turbine 120, the wind turbine 120 and the LSRL 110 will first be described.

Figure 1:
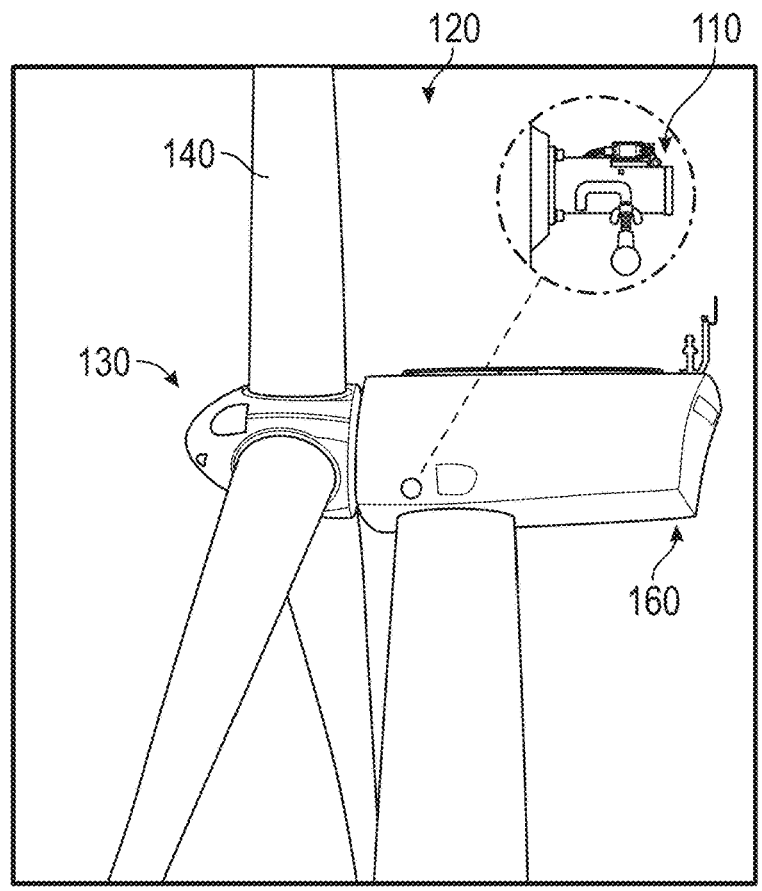
FIG. 1 illustrates a perspective view of a prior art wind turbine including a Low Speed Rotor Lock (LSRL).
Figure 2:
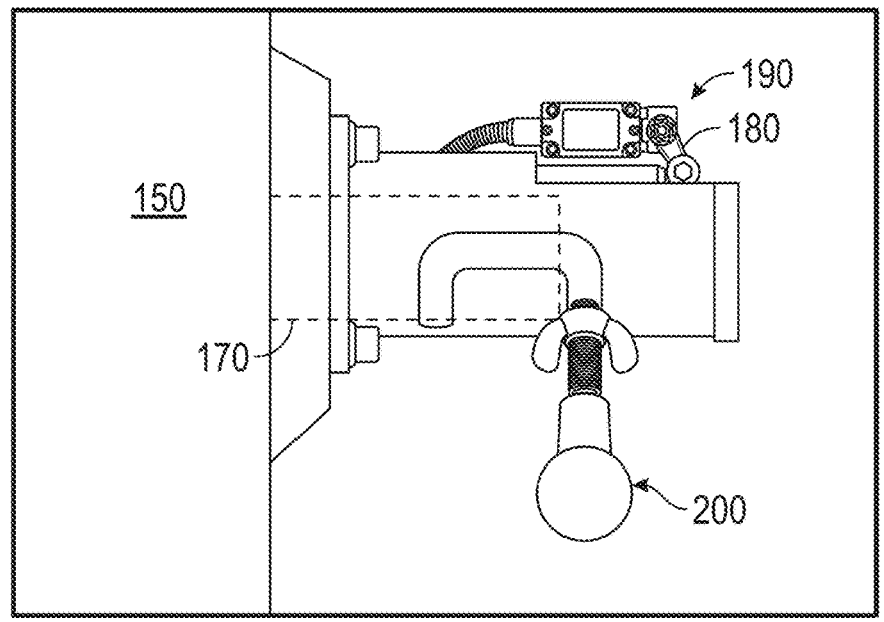
FIG. 2 illustrates a side elevational view of the LSRL of FIG. 1 with the LSRL disengaged from a rotor of the wind turbine, allowing the rotor to rotate.
Figure 3:
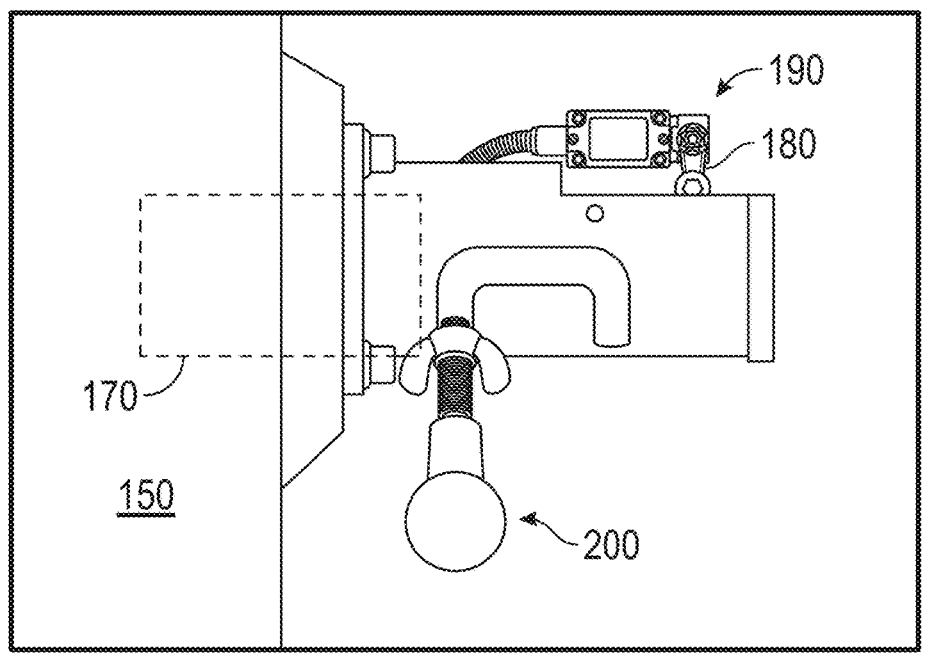
FIG. 3 illustrates a side elevational view of the LSRL of FIG. 1 with the LSRL engaged with the rotor of the wind turbine, preventing the rotor from rotating.

With reference to FIGS. 1-3, the wind turbine 120 includes a hub/nose cone 130 that blades 140 connect to. The nose cone 130 is connected to a rotor 150 that protrudes from a gearbox located inside of a nacelle 160, which houses the gearbox, a generator, and other components. The LSRL 110 is located under the rotor 150, inside of the nacelle 160.

Figure 4:
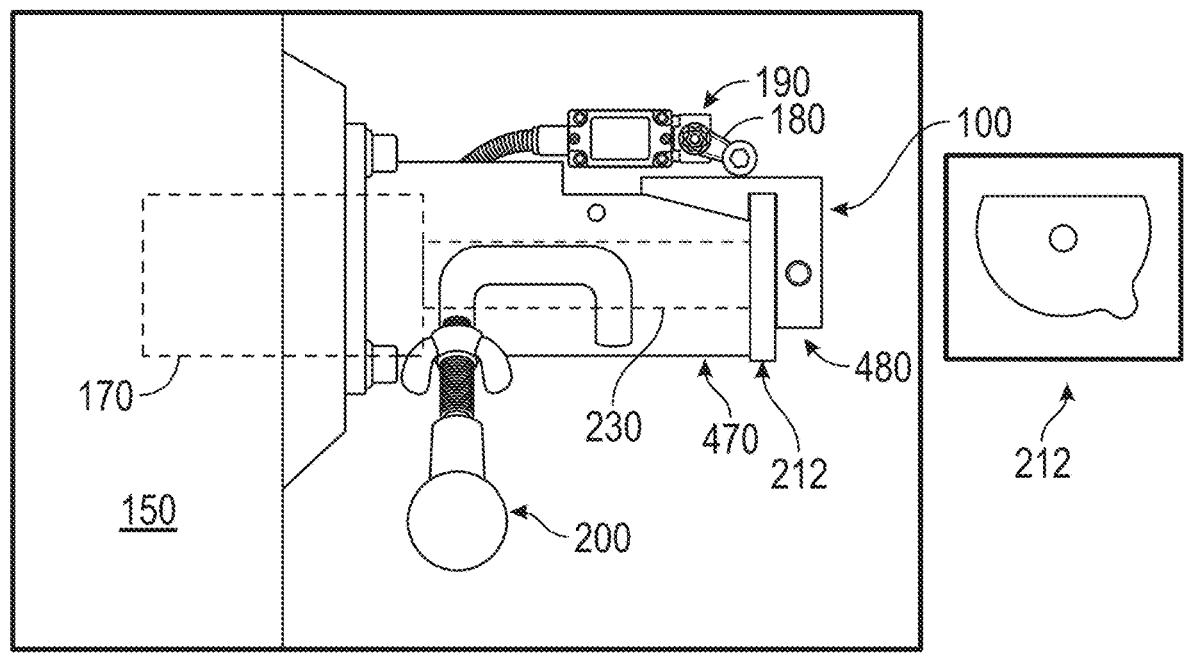
FIG. 4 illustrates a side elevational view of the LSRL of FIG. 1 with the LSRL engaged with the rotor of the wind turbine, preventing the rotor from rotating, and an embodiment of a lock-out tag-out (LOTO) engaged with the LSRL.
Figure 5:
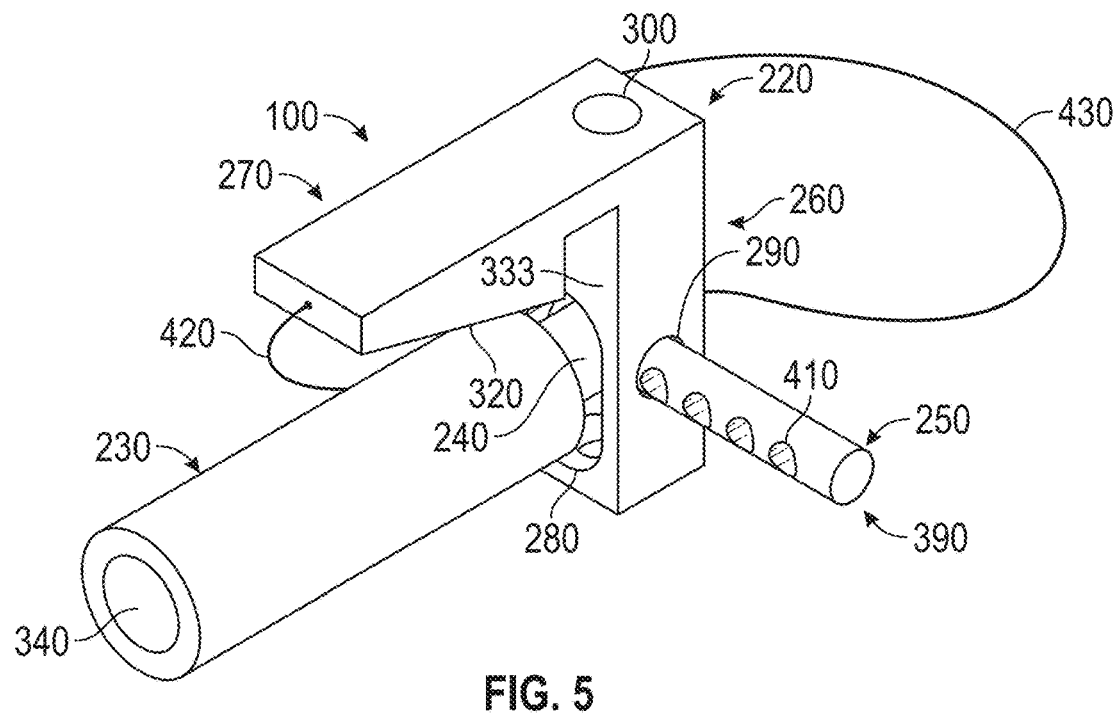
FIG. 5 illustrates a first perspective view of the LOTO device of FIG. 4.
Figure 6:
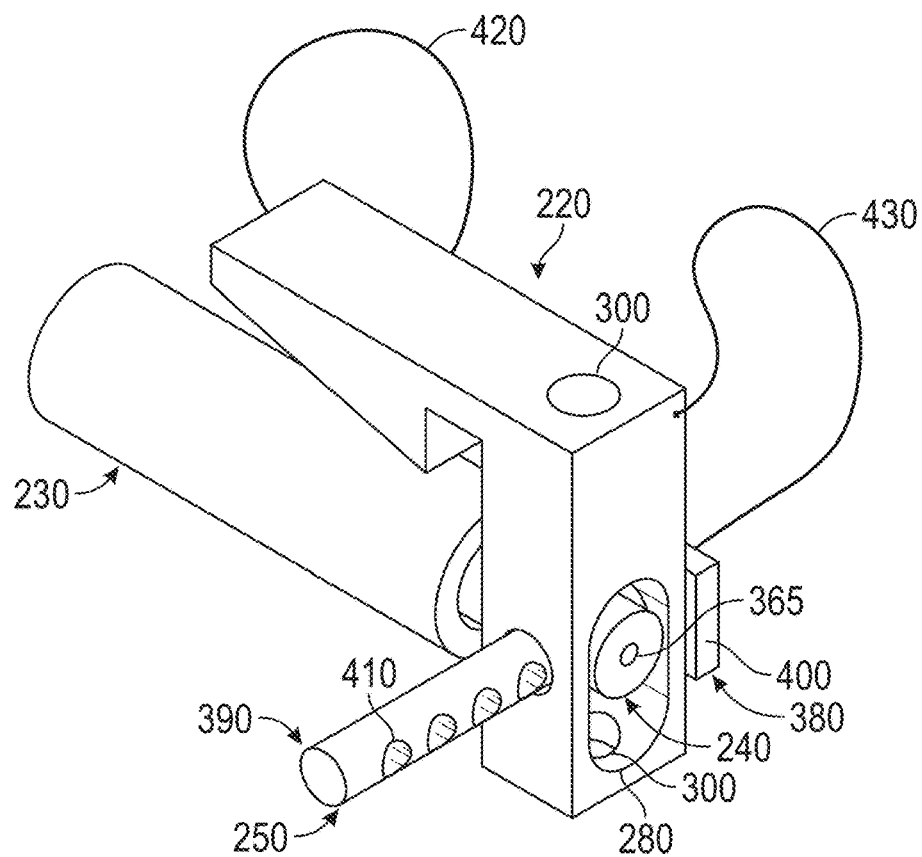
FIG. 6 illustrates an alternative perspective view of the LOTO device of FIG. 4.
Figure 7:
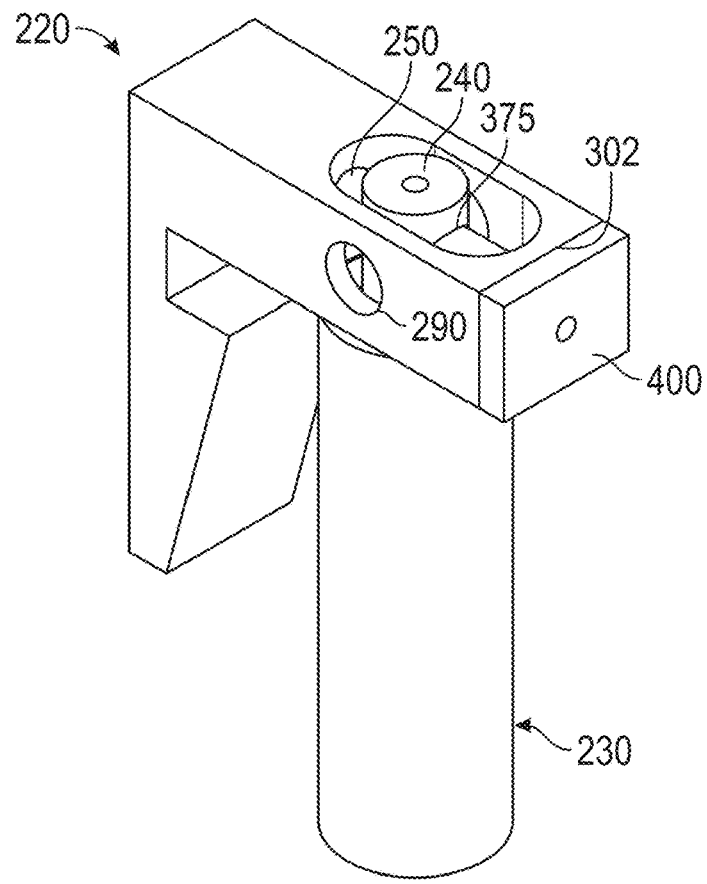
FIG. 7 illustrates a perspective view of the LOTO device of FIG. 4 in a storage configuration.
Figure 8:
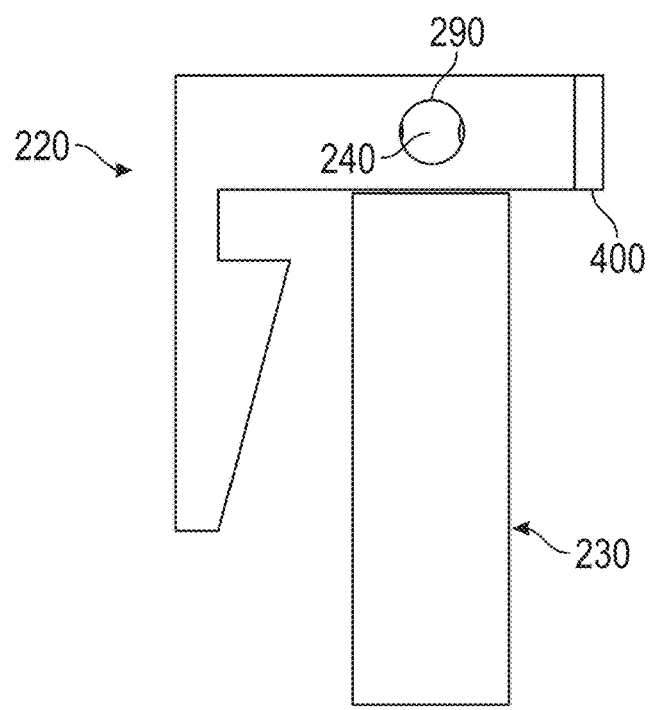
FIG. 8 illustrates a side-elevational view of the LOTO device of FIG. 4 in a storage configuration.

As shown in FIGS. 2 and 3, a component of the LSRL 110 is a plunger 170 that can be pushed forward to prevent the rotor 150 from spinning. When the plunger 170 is not actively preventing the rotor from spinning, it engages a lever 180 on a limit switch 190 to let the wind turbine 120 know that everything is in normal operation. A handle 200 attached to the plunger 170 on the LSRL 110 is what is used to push the plunger 170 forward. The handle 200 can be pushed forward to engage the plunger 170 as a locking mechanism, preventing the rotor 150 from spinning. The lever 180 on the limit switch 190 becomes disengaged and activates a safety chain throughout tower 210 after engaging the plunger 170 using the handle 200. The LSRL 110 includes a front plate 212 with a hole 214 (FIG. 4).

With reference to FIGS. 4-8, an embodiment of the LOTO device 100 will be described. The LOTO device 100 includes a handle 220, a pipe 230, a rod 240, and a locking pin 250, each of which will described in turn below.

The handle 220, which may be made of a light-weight aluminum, includes a base 260 and a head 270. The handle 220 includes first slotted hole(s) 280 extending through the base 260 in the same direction as the longitudinal direction of the pipe 230 and the rod 240 as described below. The handle 220 includes second hole(s) 290 extending through the base 260 transversely to and communicating with the slotted first hole(s) 280. The handle 220 includes third hole 300 extending from the head 270 and through the head 270 and the base 260 to foot 302, communicating with the slotted first hole(s) 280. An underside 310 of the head 270 includes an angled face 320 and a notch 330.

The pipe 230, which may be made of hardened steel, has a cylindrical configuration with bore 340.

The rod 240 has a cylindrical configuration with opposite first end 350 and second end. The first end 350 may include a threaded portion 365 configured to be coupled to a fastener and the second end may include a threaded portion configured to be coupled to a fastener. The rod 240 includes a transverse hole 375.

The locking pin 250 is has a cylindrical configuration with opposite first end 380 and second end 390. The first end 380 may include a rectangular stopper 400 with the same dimensions as the foot 302 of the handle 220. The rod 240 includes a plurality of transverse holes (e.g., four holes) 410 that receive one or more (e.g., four) separate LOTO locks.

The LOTO device 100 includes one or more (e.g., two) tethers 420, 430 coupling the handle 220 to the rod 240 and the locking pin 250.

With reference additionally to FIG. 9, a method 435 of using the LOTO device 100 to lock out the LSRL 110 to prevent the rotor 150 from spinning will now be described. Step 440 includes engaging (e.g., via the notch 330) the front plate 212 of the LSRL 110 with the handle 220. Step 460 includes receiving the rod 240 within the first hole(s) 280 of the handle 220 on a first side 470 of the front plate 212 and within the pipe 230 (may be lowered into the cavity and kept in place using the rod 240, the length of the rod 240 is long enough to support and secure the pipe 230 in place) on an opposite second side 480 of the front plate 212. The hole 214 of the front plate 212 also receives the rod 240 to support the pipe on the opposite second side 480 of the front plate 212. The slotted first hole(s) 280 in the handle 220 helps facilitate the installation of the rod 240 through the front plate 212 and pipe 230. Step 490 includes receiving the locking pin 250 within both the second hole(s) 290 of the handle 220 and the hole 375 of the rod 240 to secure the rod 240 in position relative to the handle 220. The locking pin 250 fits perpendicular to the direction of the rod 240 effectively locking the handle 220, the rod 240, and the pipe 230. The locking pin stopper 400 prevents the locking pin 250 from slipping through the handle 220. Step 500 includes receiving one or more separate LOTO locks in the one or more holes 410 of the locking pin 250. Step 510 includes using the pipe 230 of the LOTO device 100 engaged to the LSRL 110 to maintain the plunger 170 engaged with the rotor 150 to prevent the rotor 250 from spinning. The pipe 230 acts as a spacer to prevent the plunger 170 from moving back to its original position. The head of the handle of the LOTO device 100 is configured to engage the limit switch lever 180 even though the plunger 170 has been pushed forward. The LOTO device 100 stays in place on the front plate 212 of the LSRL 110 using the notch 330 on the handle 220 of the LOTO device 100, the rod 240, and the locking pin 250. The one or more tethers 420, 430 prevent the rod 240 and the locking pin 250 from being dropped down the tower 210.

Optional step 530 includes providing the LOTO device 100 in a storage configuration by inserting the rod 240 within the first slotted hole(s) 280 of the handle 220 and the bore 340 of the pipe 230, and inserting the locking pin 250 within both the third hole 300 of the handle 220 and the transverse hole 375 of the rod 240. Thus, the one hole 300 going through the entire length of the LOTO device handle 220 also fit the locking pin 250 during storage. The rod 240 may be rotated 90 degrees along its axis to allow the locking pin 250 to pass through the transverse hole 375 in the rod 240 for storage. The threaded portion of the second end of the rod 240 may be used with a washer and fastener to keep the pipe 230 secured in place while in storage.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

We claim:

1. A lock-out tag-out (LOTO) device for a low-speed rotor lock of a wind turbine generator including a rotor, the low-speed rotor lock including a front plate with a hole and a plunger that moves relative to the front plate to engage the rotor to prevent the rotor from spinning, comprising:
   a handle including at least first and second holes and configured to engage the front plate of the low-speed rotor lock;
   a pipe configured to maintain the plunger engaged with the rotor to prevent the rotor from spinning;
   a rod configured to be received within the first hole of the handle on a first side of the front plate and be received within the pipe on an opposite second side of the front plate, the rod including a hole;

a locking pin configured to be received within both the second hole of the handle and the hole of the rod to secure the rod in position relative to the handle, the locking pin including one or more holes configured to receive one or more separate LOTO locks.

2. The LOTO device of claim 1, wherein the LOTO device includes a locking configuration where the handle engages the front plate of the low-speed rotor lock, the pipe maintains the plunger engaged with the rotor to prevent the rotor from spinning, the rod is received within the first hole of the handle on a first side of the front plate and is received within the pipe on the opposite second side of the front plate, the locking pin is received within both the second hole of the handle and the hole of the rod to secure the rod in position relative to the handle, and the one or more holes of the locking pin receive one or more separate LOTO locks.

3. The LOTO device of claim 2, wherein the low-speed rotor lock includes a limit switch lever that causes a safety chain to be activated when disengaged and deactivated when engaged, and the handle includes a head configured to engaged the limit switch lever to deactivate the safety chain.

4. The LOTO device of claim 1, wherein the handle includes a third hole and the LOTO device includes a storage configuration where the rod is received within the first hole of the handle and the pipe, and the locking pin is received with both the third hole of the handle and the hole of the rod.

5. The LOTO device of claim 1, wherein the rod includes an end configured to be coupled with a fastener to secure the handle, the pipe, the locking pin, and the rod in the storage configuration.

6. The LOTO device of claim 1, wherein the handle includes a notch configured to engage the front plate of the low-speed rotor lock.

7. The LOTO device of claim 1, further including one or more tethers coupling the handle to the rod and the locking pin.

8. The LOTO device of claim 1, wherein the handle includes a base and a head, the base including the first and second holes, the first hole being a slotted hole and the second hole extending transversely to and communicating with the slotted first hole.

9. The LOTO device of claim 1, wherein the handle includes a third hole extending from the head and through the base, communicating with the slotted first hole.

10. A method of using the LOTO device of claim 1 to lock out the low-speed rotor lock to prevent the rotor from spinning, comprising:
  engaging the front plate of the low-speed rotor lock with the handle;
  receiving the rod within the first hole of the handle on a first side of the front plate and within the pipe on the opposite second side of the front plate;
  receiving the locking pin within both the second hole of the handle and the hole of the rod to secure the rod in position relative to the handle;
  receiving one or more separate LOTO locks in the one or more holes of the locking pin;
  using the pipe of the LOTO device engaged to the low-speed rotor lock to maintain the plunger engaged with the rotor to prevent the rotor from spinning.

11. The method of claim 10, wherein the low-speed rotor lock includes a limit switch lever that causes a safety chain to be activated when disengaged and deactivated when engaged, the handle of the LOTO device includes a head configured to engage the limit switch lever in the locking configuration, and the method further comprising using the head of the handle to engage the limit switch lever to deactivate the safety chain.

12. The method of claim 10, wherein the handle includes a third hole and the LOTO device includes a storage configuration where the rod is received within the first hole of the handle and the pipe, and the locking pin is received with both the third hole of the handle and the hole of the rod, and the method further comprising putting the LOTO device in the storage configuration by inserting the rod within the first hole of the handle and the pipe, and inserting the locking pin within both the third hole of the handle and the hole of the rod.

13. The method of claim 12, wherein the rod includes an end configured to be coupled with a fastener to secure the handle, the pipe, the locking pin, and the rod in the storage configuration.

* * * * *